Jan. 16, 1945. D. FIRTH ET AL 2,367,390
CLUTCH
Filed Sept. 2, 1942 2 Sheets-Sheet 1
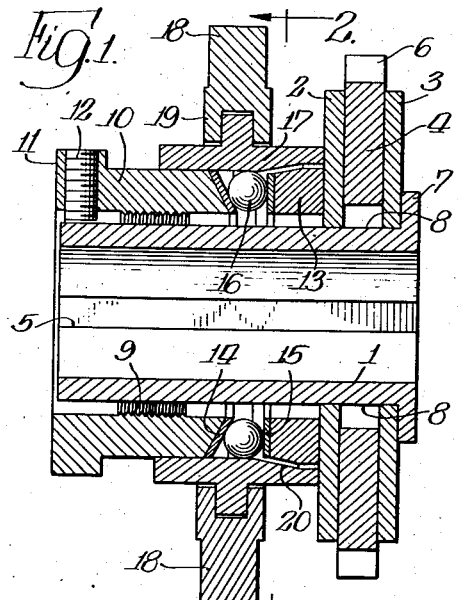
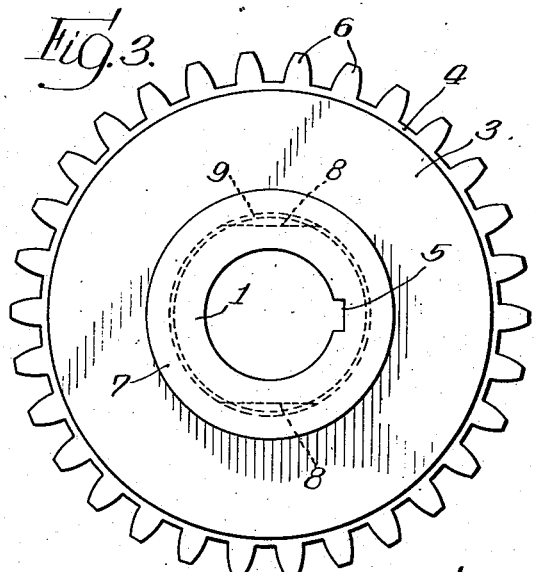
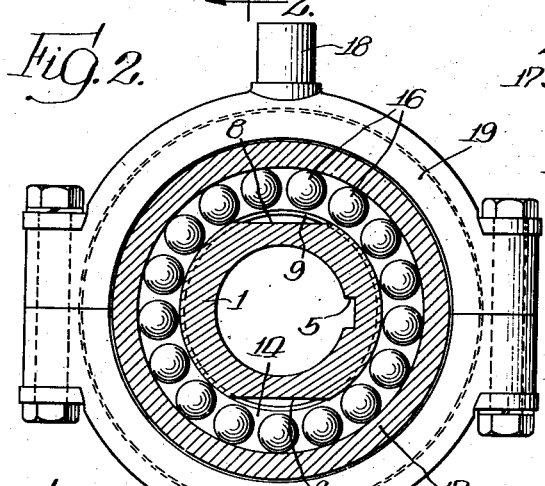
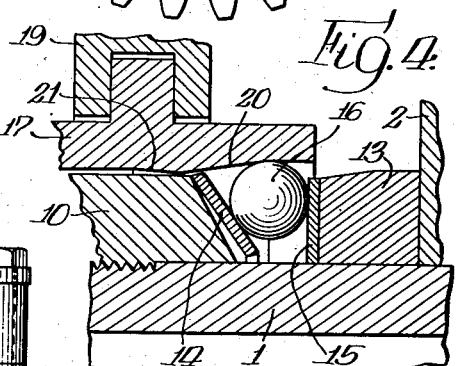
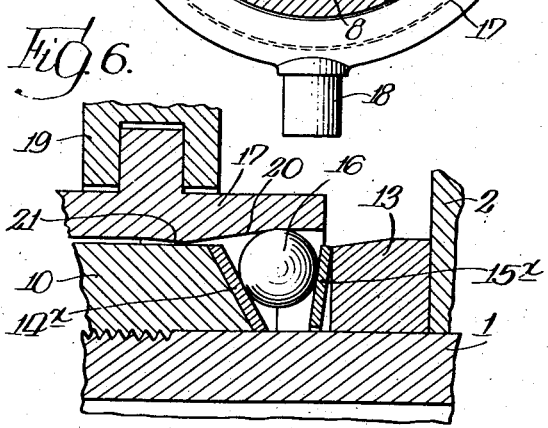
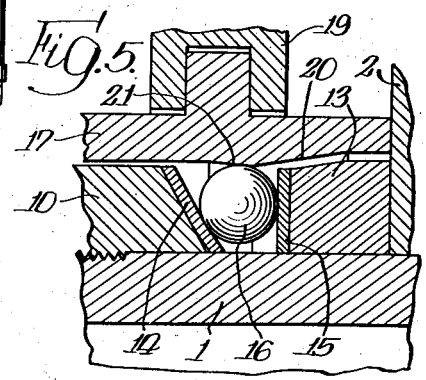
INVENTORS.
David Firth
Marion L. Fast,
By Osgood H. Dowell
Atty.

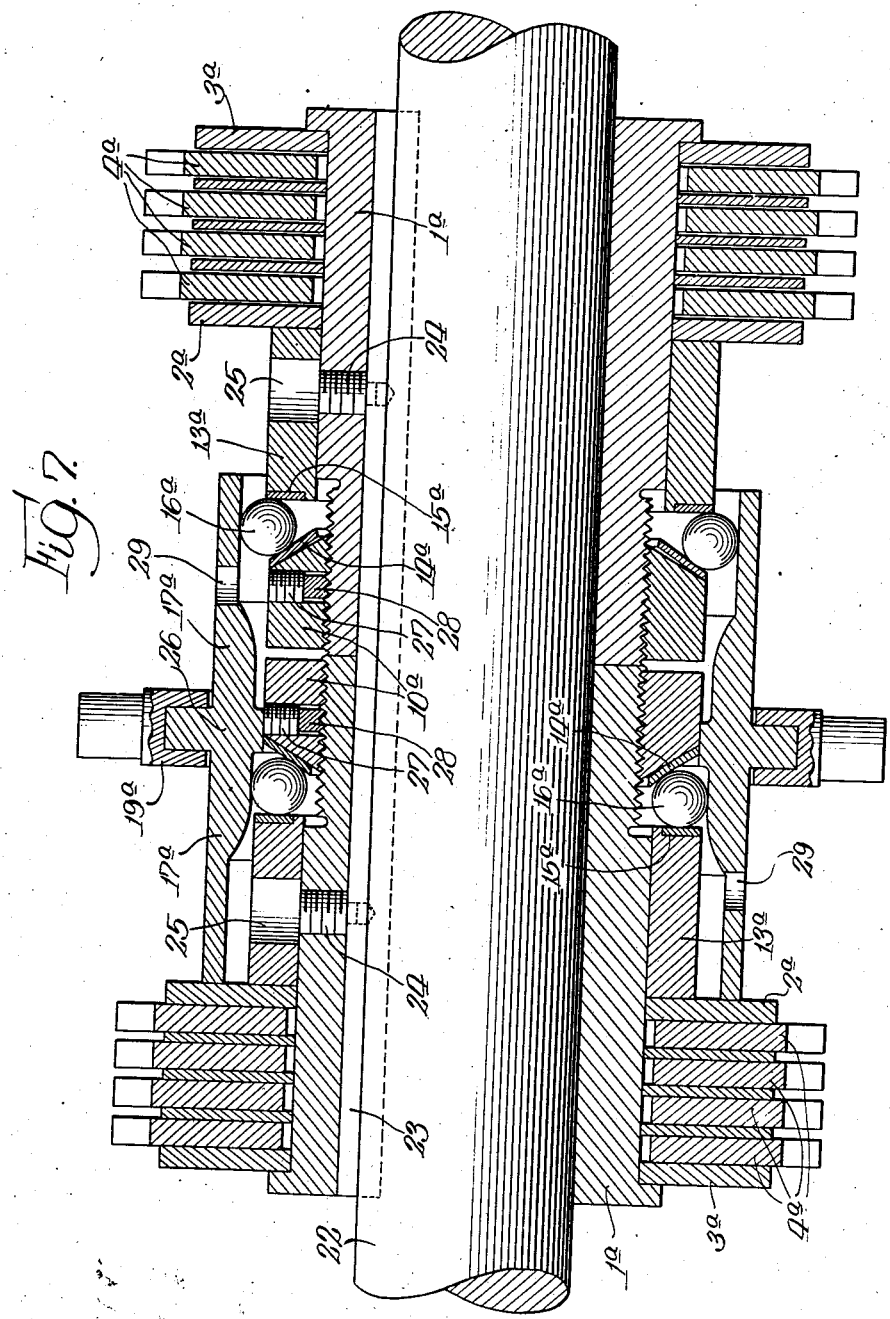

Patented Jan. 16, 1945

2,367,390

UNITED STATES PATENT OFFICE 2,367,390

CLUTCH

David Firth and Marion L. Fast, South Bend, Ind., assignors to Dodge Manufacturing Corporation, Mishawaka, Ind., a corporation of Indiana Application September 2, 1942, Serial No. 457,026

8 Claims. (Cl. 192—93)

This invention relates to friction clutches, more particularly of the type in which the frictional clutching elements are forced into coaction or pressed together by forcing an annular series of balls radially inwardly as wedging elements between relative axially spreadable thrust transmitting members. An object of the invention is to provide an improved clutch of such type embodying means whereby to obtain a cushioning effect in the clutch applying operation and to assure prompt release action of the balls when the clutch operating means is shifted to release position. Another object is to provide a practicable and efficient clutch of simple and compact construction and one which can be economically manufactured. These and subsidiary objects are accomplished by means exemplified in the accompanying drawings, wherein:

Fig. 1 is a central longitudinal sectional view of a clutch of one practicable construction embodying the invention.

Fig. 2 is a cross section thereof taken on the line 2—2 of Fig. 1, looking in the direction of the arrows.

Fig. 3 is an end elevation looking toward the right hand end of Fig. 1.

Figs. 4 and 5 are enlarged detail views of a fragmentary portion of the structure, Fig. 4 showing the relative positions of the parts thereof in the release condition of the clutch and Fig. 5 showing the relative positions of said parts in the applied or clutching condition.

Fig. 6 is a view similar to Fig. 4 showing a contemplated modification.

Fig. 7 is a central longitudinal sectional view of a duplex clutch embodying the invention, with certain additional features of advantage in such duplex clutch.

Referring to Figs. 1 to 4 of the drawings, the illustrative clutch therein shown comprises a clutch hub 1 carrying in driving connection therewith a pair of annular clutch plates 2 and 3 cooperable to clamp or squeeze an interposed friction disc 4. The clutch hub 1 is to be fixed on a shaft in driving connection therewith by engagement of a shaft key with a keyway 5 in the hub, and to be secured against longitudinal movement relative to the shaft by a set screw (not shown). The friction disc 4 is to be carried by and in driving connection with a rotatable member (not shown) to be clutch-connected to the shaft. One practicable way of securing the friction disc to such rotatable carrying member is by forming the friction disc with peripheral teeth 6 to be slidably interfitted with internal teeth of a bell-shaped extension of such rotatable carrying member. Instead of the single friction disc 4 there may be a multiple of such discs arranged in alternation with plates carried by and in driving connection with the hub, as in Fig. 7.

In the clutching operation, the axially movable clutch plate 2 is forced toward the clutch plate 3, and the thrust imparted to the latter is taken by the clutch hub which in this instance has an end flange 7 constituting a thrust shoulder against which the clutch plate 3 abuts. The clutch plate 3 could be integral with the hub, but for simplicity and economical advantage in manufacture the construction shown is provided, according to which the clutch plate 3 is made as a separate element identical to the clutch plate 2 and the hub has said flange 7 to take the thrust imparted to the clutch plate 3, both clutch plates being slipped over and slidably fitted on the shaft which is cut away at opposite sides to form broad flat surfaces 8, the two clutch plates having correspondingly shaped bores to fit the hub, whereby the hub and clutch plates are in driving connection through engagement of the broad flat hub faces 8 with the corresponding bore portions of the clutch plates.

The hub has a screw-threaded portion engaged by the correspondingly interiorly screw-threaded portion 9 of a tubular thrust member 10 functioning as an adjusting nut. Said member 10 is shown as having a flange 11 at the end thereof remote from the hub flange 7. A set screw 12 screwed through said flange against the hub secures said member 10 in fixed relation to the hub. Between the member 10 and clutch plates and abutting against the axially movable clutch plate 2 is an annular axially movable thrust transmitting member 13. Said member 13 could be integral with the clutch plate 2 but for simplicity and economical advantage is made as a separate element, its function being that of an axially movable spacer for transmitting thrust to the clutch plates. The adjacent annular faces of the thrust members 10 and 13 are axially separated and radially outwardly diverging, at least one of said end faces being conical. Seated against the respective said end faces are hard metal washers 14 and 15. Preferably, as in the illustrative construction, the thrust member 10 has a conical end face to which is applied a conical washer 14, whereas the thrust member 13 has a flat end face to which is applied a flat washer 15. Thus said adjacent end faces of the thrust members and the washers seated thereagainst diverge at an acute angle. A plurality of steel balls 16 arranged in an annular series bear against the confronting and outwardly diverging faces of said hardened metal washers, these balls being of such diameter that in the release condition of the clutch they project radially outward beyond the peripheries of the thrust members 10 and 13. There may be a full complement of such balls, in no greater number than to allow them to be forced radially inwardly to the position shown in Figs. 1 and 2; or there may be less than a full complement, the balls being suitably spaced by suitable spacing means. Thus there may be as few as three balls spaced approximately equal angular distances apart. The radial positioning of the balls is controlled by a revoluble and axially shiftable cam sleeve 17 mounted on the member 10 and operable by suitable means such for example as a clutch throw lever (not shown) having a yoke arm engaging the diametrically opposite trunnions 18 of a collar 19 swiveled on the cam sleeve; said collar, which has an internal annular channel engaging an annular rib on the cam sleeve, being constructed in two half parts bolted together as shown in Fig. 2.

In the release condition of the clutch, the cam sleeve 17 abuts against the flange 11 of the thrust member 10. In this position, the balls 16 contact with the interior cylindrical surface of the fore end of the cam sleeve, as shown in Fig. 4. As the cam sleeve is moved to the right from said release position to the clutch applying position shown in Figs. 1 and 5, the conical interior surface 20 of the cam sleeve engages the balls, forcing them radially inwardly so that they act wedgingly to forcibly spread the thrust members 10 and 13 by axial displacement of the member 13 and clutch plate 2 which it abuts, thus forcing the frictional clutching elements into coaction or pressing them together. The interior surface of the cam sleeve at 21 is very slightly tapered reversely to the taper of the conical surface 20, so that when the cam sleeve is forced full way to the right the balls are engaged by said very slightly reversely tapered surface 21, whereby the clutch is self-locking in applied or clutching condition. As the thrust of the bearing balls against the members 10 and 13 is transmitted through the hardened metal washers 14 and 15, said thrust members 10 and 13 are relieved from wear of the balls and may therefore be made of ordinary steel or soft cast iron or even cheap moldable material, which is of important advantage for economy of construction.

As the cam sleeve 17 is shifted to the left from the clutching position shown in Figs. 1 and 5 to the release position shown in Fig. 4, the balls 16 are allowed to move radially outwardly by centrifugal force. Ordinarily, and especially if the shaft is rotating at fast speed, the centrifugal force would move the balls outwardly. However, if the balls bore directly against the adjacent end faces of the thrust members 10 and 13 or against washers seated squarely and unyieldingly thereagainst, which end faces and washers diverge at an acute angle, then in the clutch applying operation the balls might become so tightly wedged or jammed as to retard or interfere with the prompt outward movement of the balls as the cam sleeve is moved to release position. One of the objects of the invention is to avoid such an objection, which is accomplished by means incidentally giving a desirable cushioning effect in the clutch applying operation. The means for such purpose embodied in the illustrative construction is as follows: The conical washer 14 is a resilient element, being a continuous or unsplit conical washer of spring metal. This washer 14 and the end face of the member against which it is seated are correspondingly conical in the sense that they slant in the same general direction, but the slant of the conical washer relative to a plane at right angles to the clutch axis is somewhat greater than the slant of said conical end face of the member 10, so that in the release condition of the clutch the conical washer 14, while bearing at its outer or peripheral portion against said conical end face has its inner or central portion separated from such end face, as is apparent from Fig. 4. In the clutch applying operation, said conical washer is forcibly distorted or sprung out of shape by the forcing of the balls radially inwardly thereagainst, giving a desirable cushioning effect. As the cam sleeve is moved to release position, said conical washer reacts resiliently to assist in forcing the balls radially outwardly and to assure prompt initiation of release action of the balls.

In the modification shown in Fig. 6, the conical washer $14^x$ has the same slant as and is seated squarely against the conical end face of the member 10, and a conical spring metal washer $15^x$ is seated against the flat end face of the member 13, with the depressed face of said washer $15^x$ toward said flat end face so that in the clutch applying operation the washer $15^x$ would be sprung, giving cushioning effect, and in the releasing operation it would react resiliently to assist in forcing the balls radially outward.

The duplex clutch shown in Fig. 7 comprises in effect two reversely arranged clutches of the same type as and generally similar in construction to that already described; each of said clutches comprising a hub $1^a$ carrying in driving connection therewith a pair of clutch plates $2^a$ and $3^a$ cooperable to clamp or squeeze interposed friction disc means (shown in this instance as a multiple of friction discs $4^a$ arranged in alternation with other plates carried by and in driving connection with the hub), and each having an adjusting nut $10^a$ and an axially displaceable thrust transmitting member $13^a$ and an annular series of balls $16^a$ engaging the confronting faces of hard metal washers seated against the axially separated and outwardly diverging adjacent end faces of the members $10^a$ and $13^a$. The two clutches are mounted on a common shaft 22 in driving connection therewith by a key 23 and secured against relative displacement by set screws 24 having dog point protuberances engaging holes therefor in the key. The thrust transmitting members $13^a$ are provided with holes 25 for access to said screws. The two clutches are arranged with their adjusting nuts at adjacent ends, and the two sets of balls are controlled by the oppositely extending cam sleeve portions $17^a$ of a revoluble and axially shiftable member 26 mounted on the adjusting nuts and shiftable from one to the other, said member 26 having a shifter collar $19^a$ with diametrically opposite trunnions for engagement by the yoke arm of a clutch throw lever. The construction and arrangement is such that when the member 26 is midway between the two sets of frictional clutching elements both sets of balls $16^a$ are in their outward positions and both clutches are released. Upon shifting the member 26 from such neutral position to either extreme position, one set of balls is forced radially inwardly to apply the corresponding clutch. The adjusting nuts 10ᵃ are secured in fixed relation to the clutch by lock screws 27 bearing against small soft metal blocks 28 in engagement with the screw threads of the clutch hubs. Said lock screws 27 have square sockets in their outer ends for engagement of suitable wrenches. The sleeve portions 17ᵃ of the member 26 have holes 29 of smaller diameter than the balls and so arranged that in either extreme position of the member 26 it can be revolved to bring one of the holes 29 in registration with the corresponding lock screw 27. Fig. 7 shows the member 26 in its extreme left hand position, applying the left hand clutch, the right hand clutch being released. The right hand hole 29 is shown in registration with the right hand lock screw 27, so that a suitable tool or wrench can be inserted through said hole and engaged within said lock screw. Such tool can be utilized as a lever for revolving the member 26 together with the adjusting nut having the lock screw engaged by such tool. In this manner the adjusting nut can be adjusted, after which the lock screw 27 in such nut can be tightened by turning such tool. When the member 26 is shifted to its extreme right hand position, applying the right hand clutch and releasing the left hand clutch, the left hand hole 29 can be brought into registration with the lock screw 27 of the left hand clutch, so that with the use of such a tool and in the manner above described the left hand adjusting nut can be adjusted and then fixed in relationship to its hub by tightening the said left hand lock screw.

We claim:

1. A friction clutch having, in combination, a pair of coaxial annular thrust transmitting members adapted to be forcibly spread axially for forcing frictional clutching elements into coaction, the adjacent annular end faces of said members being axially separated and diverging radially outwardly, a pair of hard metal washers respectively seated against the respective said end faces, one of said washers and the end face to which it is applied being correspondingly conical, said conical washer being of spring metal and having a greater slant than said conical end face relative to a plane at right angles to the clutch axis, an annular series of bearing balls bearing against the confronting faces of said washers, and means for forcing said balls radially inwardly to forcibly spread said pair of members by wedging action of said balls against said washers.

2. A friction clutch having, in combination, a pair of coaxial annular thrust transmitting members adapted to be forcibly spread axially for forcing frictional clutching elements into coaction, the adjacent annular end faces of said members being axially separated and diverging radially outwardly, a pair of hard metal washers respectively seated against the respective said end faces, including a conical spring washer having a depressed side adjacent to the end face of the member to which it is applied and slanting relative thereto so that in its unstressed condition the washer while bearing at its peripheral portion against such end face has its central portion separated therefrom, an annular series of bearing balls bearing against the confronting faces of said washers, and means for forcing said balls radially inwardly to forcibly spread said members by wedging action of said balls against said washers.

3. A friction clutch having, in combination, a pair of coaxial annular thrust transmitting means adapted to be forcibly spread axially for forcing frictional clutching elements into coaction, one of said means comprising a conical spring metal washer and a member having an annular end face against which said washer is seated, said washer being between said member and the other of said means and having its depressed side adjacent to said member, the confronting faces of said washer and other of said means diverging radially outwardly, an annular series of bearing balls bearing against said confronting faces, and means for forcing said balls radially inwardly to forcibly spread said pair of means by wedging action of said balls therebetween, said conical washer slanting relative to said end face of the member to which it is applied so that in the release condition of the clutch the central portion of such washer is unseated or separated from such end face, whereby in the clutch applying operation said washer is sprung out of shape with consequent cushioning effect and in the releasing operation reacts resiliently to assist in forcing the balls radially outwardly.

4. A friction clutch having, in combination, a pair of coaxial annular thrust transmitting means adapted to be forcibly spread axially for forcing frictional clutching elements into coaction, one of said means comprising a conical spring metal washer and an annular member having a correspondingly conical end face against which said washer is seated, said washer being between said member and the other of said means, the confronting faces of said washer and other of said means diverging radially outwardly, an annular series of bearing balls bearing against said confronting faces, and means for forcing said balls radially inwardly to forcibly spread said pair of means by wedging action of said balls therebetween, said conical washer having a greater slant than said conical end face relative to a plane at right angles to the clutch axis so that in the release condition of the clutch the central portion of said washer is unseated or separated from such end face, whereby in the clutch applying operation said washer is sprung out of shape with consequent cushioning effect and in the releasing operation reacts resiliently to assist in forcing said balls radially outwardly.

5. A friction clutch having, in combination, a pair of annular clutch plates and interposed friction disc means to be squeezed thereby, a hub carrying said plates in driving connection therewith, one of said plates being axially movable and the other held so as to sustain thrust transmitted thereto by such axially movable plate, said hub having a screw-threaded portion and a reduced unthreaded portion, an annular adjusting nut screwed on said hub, a set screw screwed through said nut against the reduced unthreaded portion of the hub for securing the nut in fixed relation to the hub, an annular axially movable thrust transmitting member between said nut and axially movable clutch plate, the latter being between said member and the other clutch plate, and means including an annular series of balls forceable radially inwardly as wedging elements between said nut and member for forcing said axially movable clutch plate toward the other.

6. A friction clutch having, in combination, a pair of annular clutch plates and interposed friction disc means to be squeezed thereby, a hub carrying said plates in driving connection therewith, one of said plates being axially movable and the other held so as to sustain thrust transmitted thereto by such axially movable plate, said hub having a screw-threaded portion and a reduced unthreaded portion, an annular adjusting nut screwed on said hub, said nut having a flange at the end thereof remote from said plates, a set screw screwed through said flange against the reduced unthreaded portion of the hub for securing the nut in fixed relation to the hub, an annular axially movable thrust transmitting member between said nut and axially movable clutch plate, the latter being between said member and the other clutch plate, an annular series of balls forceable radially inwardly as wedging elements between said nut and member for forcing said axially movable clutch plate toward the other, and operating means controlling the radial positions of said balls comprising a sleeve slidable on said nut and having an interiorly tapered surface engageable with said balls, movement of said sleeve being limited in one direction by abutment of said sleeve against said axially movable plate and in the opposite direction by abutment of said sleeve against said flange on said nut.

7. A friction clutch having, in combination, a pair of annular clutch plates and interposed friction disc means to be squeezed thereby, a hub carrying said plates, said hub having a screw-threaded portion and being cut away to form opposite flat surfaces and said plates having correspondingly shaped bores and fitted on the hub, whereby they are held in driving connection therewith, an adjusting nut screwed on said hub, a hub flange against which one of said plates abuts, the other of said plates being between said one and the adjusting nut and being axially movable, an annular axially movable thrust transmitting member between said nut and axially movable clutch plate, and means including an annular series of balls forceable radially inwardly as wedging elements between said nut and member for forcing said axially movable clutch plate toward the other.

8. A duplex clutch comprising on a common shaft two mechanisms according to claim 3 having hubs carrying their respective sets of frictional clutching elements and adjusting nuts screwed on adjacent ends of said hubs between said sets, the means for forcing inwardly the respective sets of balls of said mechanisms being oppositely tapered internal surfaces of a common revoluble and axially shiftable sleeve, there being locking means for said adjusting nuts, both nuts and sets of balls being enclosed by said sleeve in both extreme positions thereof and said sleeve having apertures registrable with and through which said nut locking means can be manipulated.

DAVID FIRTH.
MARION L. FAST.